US008130948B2

(12) United States Patent
Earnshaw

(10) Patent No.: US 8,130,948 B2
(45) Date of Patent: Mar. 6, 2012

(54) ADDRESSING OF GROUPS OF BROADCAST SATELLITE RECEIVERS WITHIN A PORTION OF THE SATELLITE FOOTPRINT

(75) Inventor: Nigel Christopher Earnshaw, Fleet (GB)

(73) Assignee: British Broadcasting Corporation, London (GB)

( * ) Notice: Subject to any disclaimer, the term of this patent is extended or adjusted under 35 U.S.C. 154(b) by 1438 days.

(21) Appl. No.: 11/462,099

(22) Filed: Aug. 3, 2006

(65) Prior Publication Data

US 2007/0030967 A1    Feb. 8, 2007

(30) Foreign Application Priority Data

Aug. 4, 2005  (GB) .................................. 0516096.5

(51) Int. Cl.
*H04K 1/10* (2006.01)
*H04N 7/167* (2011.01)

(52) U.S. Cl. ............ 380/34; 380/255; 380/38; 455/403; 455/404.2; 455/42; 370/203; 370/204; 370/205; 370/206; 370/207; 370/208; 370/209; 370/210; 370/211; 370/212; 370/213; 370/214; 370/215

(58) Field of Classification Search .................. 380/255, 380/34, 38; 455/403, 404.2, 42; 370/203–215
See application file for complete search history.

(56) References Cited

U.S. PATENT DOCUMENTS

| | | | |
|---|---|---|---|
| 3,852,750 A | 12/1974 | Klein | |
| 5,432,542 A | 7/1995 | Thibadeau et al. | |
| 5,640,452 A * | 6/1997 | Murphy | 380/258 |
| 5,903,648 A * | 5/1999 | Javidi | 380/54 |
| 6,560,340 B1 | 5/2003 | Akins, III et al. | |
| 2005/0058292 A1 * | 3/2005 | Diorio et al. | 380/270 |
| 2005/0102513 A1 | 5/2005 | Alve | |

FOREIGN PATENT DOCUMENTS

| | | |
|---|---|---|
| EP | 0 420 329 A3 | 4/1991 |
| GB | 2353347 A | 1/2001 |
| JP | 11-187013 | 9/1999 |
| WO | WO 00/67450 | 11/2000 |
| WO | WO 02-097470 A1 | 12/2002 |
| WO | WO 03/043323 A1 | 5/2003 |

OTHER PUBLICATIONS

GB Search Report Under Section 17(5) for Application No. GB0615274.8 dated Nov. 22, 2006.
Examination Report from UK Intellectual Property office dated Apr. 30, 2010 for GB0615274.8.
Response to Examination Report from UK Intellectual Property office dated Feb. 23, 2009 for EP06254024.0.
European Search Report dated Jun. 19, 2008 for EP06254024.0.

* cited by examiner

*Primary Examiner* — Yin-Chen Shaw
(74) *Attorney, Agent, or Firm* — Daly, Crowley, Mofford & Durkee, LLP

(57) ABSTRACT

A method and system enables the selective addressing of groups of broadcast receivers within part of a satellite footprint. It uses two satellites having a common transmission band to transmit respective signals, and at receivers in the footprint the phases of the signals received from the two satellites are compared. This phase difference is dependent upon receiver location, but by measuring phase difference no absolute timing or phase measurement is required. A common key is generated at the receivers in a certain area. The output of selected receivers is fed back to the broadcast control centre and is used to encode the location-based services for that area.
Preferably the operation is conducted on multiple frequencies and in multiple rounds of such frequencies. A multibit keyword can be directly generated at the receivers by use of a discrete Fourier transform (DFT) and combining its outputs for different rounds.

6 Claims, 7 Drawing Sheets

ADDRESSING OF GROUPS OF BROADCAST SATELLITE RECEIVERS WITHIN A PORTION OF THE SATELLITE FOOTPRINT

CROSS REFERENCE TO RELATED APPLICATIONS

This application claims the benefit under 35 U.S.C. §119 of UK 0516096.5 filed on Aug. 4, 2005.

BACKGROUND OF THE INVENTION

This invention relates to the selective addressing of groups of broadcast satellite receivers within a physical geographic portion of the total satellite footprint.

In satellite broadcasting there is an increasing desire for the broadcaster to be able to transmit different items to receivers in different geographical locations, that is, to provide location-aware services. With terrestrial broadcasting the problem is simply solved by transmitting the different items on different transmitters that have a limited geographical range. However, geostationary satellite transmitters have a footprint on the earth's surface that can extend to many hundreds of kilometers or even miles. Such a footprint is too large from the point of view of the broadcaster who may wish to transmit different items to receivers in different localities within that footprint.

Thus a need has been recognized for a receiver to be able to adopt a behaviour based upon its own location. Currently most receivers have a separate "set-top box" or decoder which decodes the signal, and in such cases the recognized need is for the set-top box to be able to receive services exclusively aimed at its own location. Currently such receivers and set-top boxes do not, in general, "know" where they are geographically within the satellite footprint.

Subscription television (Pay TV), or more accurately conditional-access television, which uses subscriber cards in the receiver that are individually prepared for each subscriber, overcomes this problem automatically. This is because each receiver has its individually-prepared subscriber card carrying decoding keys or the like, and these keys can be selected in dependence upon the receiver location so as to enable the receiver to receive the transmissions intended for its locality and only those transmissions. Not all location-aware services are however intended for transmission on subscription channels or to receivers equipped with such subscriber cards. Furthermore, a subscription television service of this type requires all the complexity of a subscriber management system, and there are other disadvantages to using conditional-access systems.

Thus we have appreciated that there is a need for a system which can address all the receivers of a geographical group substantially without addressing receivers not in that geographical group.

Clearly one possibility would be to include within each broadcast receiver a GPS receiver which makes use of the Global Positioning System satellite network. However, it is not feasible to require all broadcast receivers, or rather their "set-top boxes" or decoders, to be fitted with a GPS receiver.

Whatever system is used should not be one that can be easily "hacked". In particular it should not be one that can be circumvented simply by sending a key over the internet.

International Patent Application WO02/097470 describes a method of addressing a location based on latitude and longitude by transforming it into a universal location string, and uses the global positioning satellite system (GPS). U.S. Pat. No. 6,560,340 provides conditional access to encrypted cable TV services, based on entitlement information received with the service. International Patent Application WO03/043323 describes the use of digital TV broadcast signals to provide GPS-aiding information. The Abstract of Japanese Laid-Open Patent Publication 11-187013 (equivalent to Chinese Laid-Open Patent Application 1224962) describes a cryptographic key distribution system based upon a binary tree. With a system of this type groups of broadcast receivers can share a common root and be addressed as a group by encrypting the message with the common root. European Patent Application 420329 describes a GPS receiver utilizing the P-code signals of the NAVSTAR GPS system. International Patent Application WO00/67450 describes methods for determining, collecting and using the geographic locations of Internet users, the determination being made by detecting the route taken in delivering packets to the user.

SUMMARY OF THE INVENTION

We have considered what methods might be used to provide the desired receiver-location discrimination necessary for location-aware satellite broadcast services where the receiver does not have either a subscriber card or a GPS receiver to identify its location. Naturally the same methods could then also be used alternatively or additionally in receivers which do have either a subscriber card or a GPS receiver.

We have considered whether such a method might be based on determining the time taken for the transmission from the satellite to reach the receiver. If this could be done it would allow the footprint to be sliced into arc-shaped or part-annular segments, enabling different services to be transmitted to these individual segments. This would go a long way to meeting the broadcaster's requirements. However, it requires the presence at the receiver station of an extremely accurate local clock source, something that is not in practice possible. If phase measurements were to be made, the timing of the local clock is no longer important, but now it is necessary to have an extremely accurate phase reference, which again is not available in a practical receiver or set-top box.

We have now appreciated, however, that in certain circumstances there are groups of two or more closely-spaced satellites transmitting on the same frequencies and which are within the line-of-sight of and can be received by a single receiver. If measurement is made of the phase difference in the transmissions from each of the satellites in the group, then the need for an absolute timing or phase reference at the receiving station disappears. The measurement thus makes use of the relative path lengths between the receiver and two closely-spaced satellites, by comparing the phase differences between coherent signals from the two satellites. The two signals are coherent in the sense that they have a fixed phase relationship.

Such measurements will give a cycle of phase measurements over the satellite footprint, dividing it up into a plurality of arc-shaped or part-annular sectors or zones. However, unlike an absolute timing measurement, the phase difference measurement gives a repeating cycle of sectors and it is not possible to distinguish different sectors that are at the same point on the cycle but on different cycles.

We have accordingly appreciated that for best results measurements should be made of the phase difference at more than one transmission frequency. Preferably the measurements should be made at a series of frequency steps. Preferably also, the measurements are repeated at at least a second series of frequencies in which the frequency step size is now changed to a different value. This we refer to below as a second 'round'. The resultant cycles of the phase differences will not then coincide and will have different cycle lengths which can be used in combination to define a much larger repeating pattern of arc-shaped or part-annual sectors right across the satellite footprint. Conveniently the frequency step size is uniform for each round, though non-linear frequency steps can be contemplated and may be advantageous in certain circumstances. They do, however, require a more complex receiver.

Furthermore, if a plurality of measurements are made at each frequency but with offset delays, then the measurements of phase difference can neatly be used to generate a multi-bit decoding or decryption codeword, where the measurement at each frequency provides part of the information from which a multi-bit codeword can subsequently be derived.

The measurements made at different geographical locations will be different and will produce different codewords. These codewords will not directly enable the receiver or set-top box to "know" where it is, but we have appreciated that nevertheless the codewords enable the transmission and appropriate reception of location-aware services. This is achieved in an overall broadcasting system as follows. Selected geographically-spaced receivers in the footprint, the locations of which are known, feed their codewords back to a system control centre. Any transmission intended for a sector in which a given such receiver lies is then encrypted using the codeword fed back from that receiver. This gives the required discrimination between sectors.

The system may be able to operate on the carrier-wave signals transmitted by the satellites and make the phase-difference measurements by reference to the carrier waves. Alternatively the carrier-wave signals may be modulated with a predetermined modulation, which is detected at the receiver station, thereby making the detection easier.

In practice the phase-difference measurement system may not need to operate continuously, but can operate discontinuously or intermittently, thus avoiding the undesirable effect of a sudden service change in the middle of a television programme.

A system embodying the invention can thus be used to transmit key material, that is binary information to be transmitted, to a specific part of a satellite receiver network as a common signal to all receivers in the network. The signal as received by the individual receivers can nevertheless be specific to part of the network by virtue of the shared physical network geometry of that part of the network, it being extracted by similar processing executed by each receiver.

In such an arrangement, the system provides the following advantageous features. The technique may be used to transmit binary data to groups of receivers over networks whose physical geometry is not well characterised. This is possibly due to a feedback path introduced to allow the transmitter to learn what was actually received by the different receivers. In this way the transmitter can subsequently encode or mark data for the network segment that recognises the specific binary pattern. This allows the addressing of receivers in a time-varying or uncharacterised network.

Secondly, clusters of receivers can be differentiated on the basis of their derived signal reception, as the technique exploits length variations on alternative physical propagation paths to the receivers. The receiver is left to derive a localised receive signal from the differential between the signals received over non-identical paths. The size and location of the receiver groups that share a common derived reception signal are a function of the nature of the differential propagation delays between receivers and the respective signal sources, along with the waveform transmission parameters employed.

The system does not require the time synchronisation of the measurement process by the receivers in the field. This is because variations in path length are detected through phase comparison and not timing synchronisation. Instead there is a less stringent requirement for a stable local oscillator within each receiver that can be phase steered to an incoming signal and remain stable over a reasonable measurement time window, which is of an order much greater than that derived from positional time-delay calculations. This makes this technique particularly suitable for satellite broadcast television receivers, where the receivers themselves are not interconnected.

The present invention in its various broadest aspects is defined in the independent claims below. Advantageous features of the invention are set forth in the appendant claims.

BRIEF DESCRIPTION OF THE DRAWINGS

The invention will now be described in more detail, by way of example, with reference to the drawings, in which.

DETAILED DESCRIPTION OF THE PREFERRED EMBODIMENT OF THE INVENTION

A preferred system embodying the invention will now be described which is designed for the regional distribution of encryption (or more strictly decryption) keys, which are intended to enable the descrambling of broadcast television or radio content from a satellite. Current satellite broadcasting platforms give a broadcast satellite footprint that spans a large geographical area that does not fall conveniently along national boundaries. However, within this footprint there are often groups of geographically-separate populations that are considered homogeneous for the purposes of distributing broadcast content over satellite. The broadcaster will wish to deliver a service that can be viewed by the whole of a given one of those populations but substantially only by that population.

In order to limit the descrambling of the service to a given region within the satellite footprint, the system makes the keys required to decrypt the control words for the descrambling only available in a specified region within the footprints. Desirably:

1. the control words for one region are not easily deduced for other regions;

2. receivers in one region cannot receive or deduce the corresponding data for another region; and 3. the control words can be varied by the broadcaster on a per-broadcast basis.

The system to be described requires that the broadcaster can share its services over two or more closely-spaced individual satellites with some transmissions on one satellite and the rest on another. The receivers should have access to this limited number of two or more concurrently-visible satellites.

System

Figure 1:
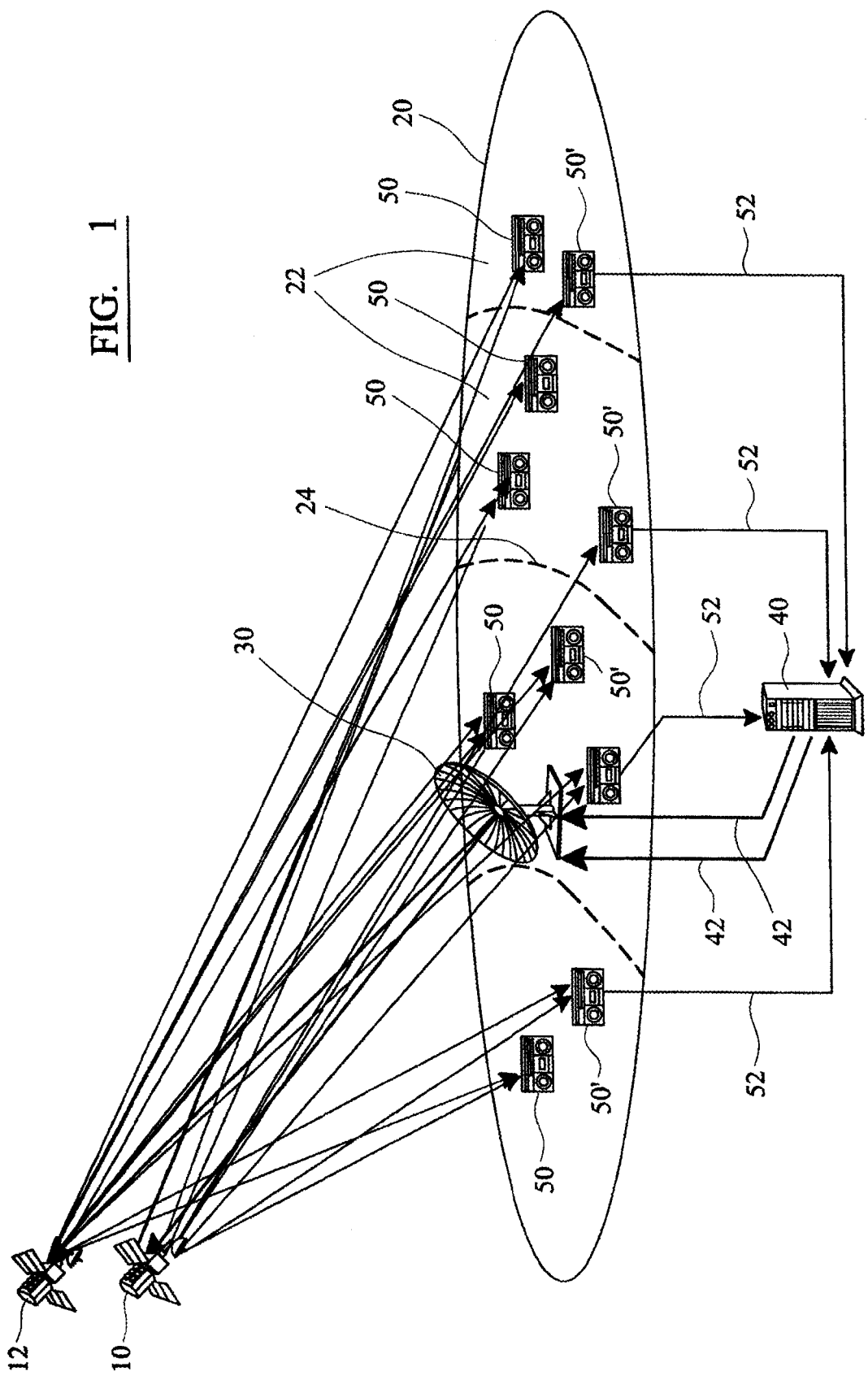
FIG. 1 is a general view illustrating a system for addressing location-based groups of satellite broadcast receivers.

An outline of the system embodying the invention is now given with reference to FIG. 1 of the drawings. This shows two geostationary satellites 10,12 which are closely spaced but nevertheless separate, and which give rise to a broadcast footprint 20 on the earth's surface. The satellites 10,12 receive their transmission signals from a common ground station 30, though, in principle, separate ground stations could be used. The ground station 30, and hence the transmission from the satellites 10,12, is controlled by a computerised broadcast control centre 40 connected to the ground station by land lines 42.

Within the footprint 20 there are a large number of broadcast receivers of which a small number of receivers 50 are shown. A small proportion of these receivers, spread across the footprint, are connected to the control centre 40 by land lines 52, for example by telephone lines or through the internet. These receivers, referenced 50', provide outputs to the control centre 40.

The purpose of the system is to sub-divide the footprint 20 into a number of sectors or zones 22 as indicated by the dashed sector or zone boundaries 24. The sectors represent the intersection of concentric circles with the footprint 20, and are thus approximately arc-shaped or part-annular (strictly: part-conic sections) with the side edges defined by the periphery of the footprint. The orientation of the sector boundaries across the footprint of the satellite transmission will depend on the relative positions of the satellites as seen from the receivers in the footprint. As shown, the sectors lie along the length of the footprint. Although shown as thin lines, as a practical matter the edge of the footprint and the sector boundaries will be somewhat diffuse.

This subdivision is effectively only in one direction, namely along the length of the footprint, aligned with the line joining the Satellites. In practice the need is for a sub-division that is more in the nature of a grid. This can be achieved by choosing two pairs of satellites, and repeating the operation with the two pairs. The lines joining the pairs of satellites must be at an angle to each other as seen from the receiver and are preferably substantially orthogonal.

Figure 2:
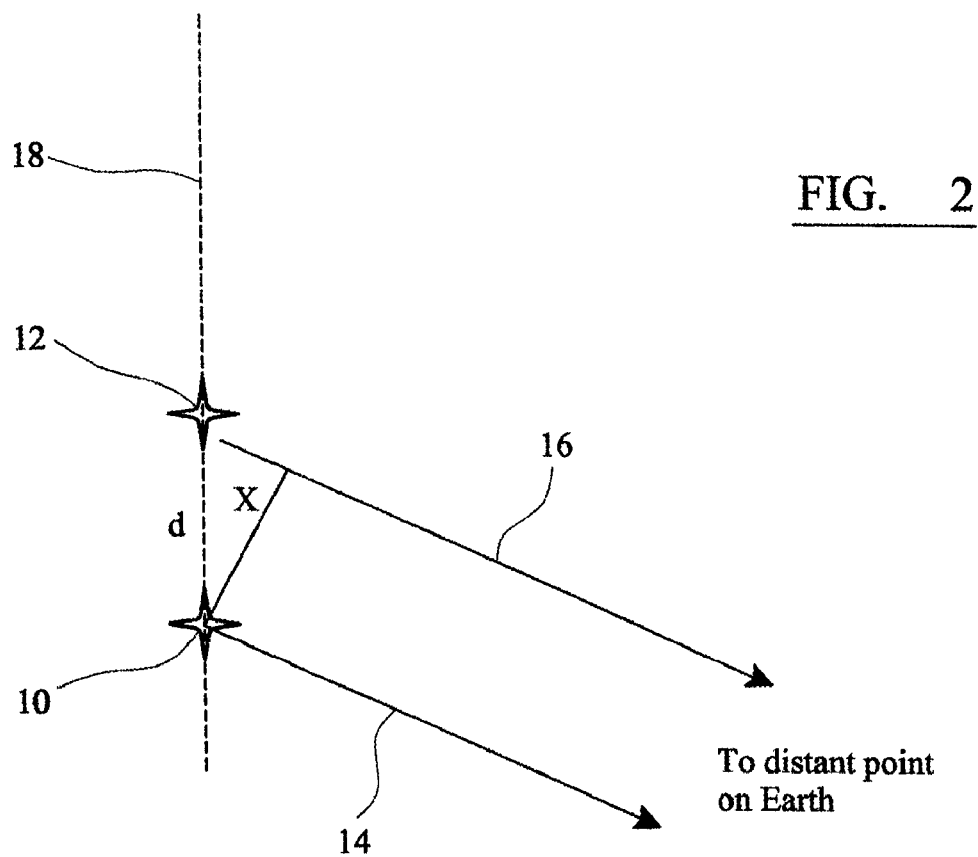
FIG. 2 is a diagram showing the signal paths emanating from the satellites in the system of FIG. 1.

The system relies on the fact that in general there will be a different path length between two separate but closely-spaced satellites and a given point on the earth's surface. This is illustrated in FIG. 2, which shows the two satellites 10,12 and their direct transmission paths 14,16 to a distant point on earth. The satellites are spaced by a distance d along the line 18 joining them, shown by a dashed line. Assuming that the paths 14,16 can be regarded as parallel, and that the perpendicular to the paths 14,16 makes an angle X to the line 18 joining the satellites, then the path difference is d.Sin(X). The angle X varies across the satellite footprint 20, and thus the path length difference also varies across the footprint. Thus, the path length difference can be used to enable the location along the length of the footprint to be discriminated. No measurement of path length is ever actually made as such. Rather, in each zone an output is obtained which is unique to that zone. That is all that matters. The output does not have to represent or measure anything; we have appreciated that all that matters is its uniqueness.

By detecting variations in path length using phase comparison and not by using timing synchronisation, there is no need to synchronise the measurement process at the different receivers. All that is required is that there is a reasonably stable local oscillator at each receiver, which can be phase-steered to an incoming signal, and which will remain stable over a reasonable measurement time window.

Geostationary satellites lie above the earth's equator, and thus the variation in angle X will be related to the variation in latitude over the satellite footprint.

Two closely-spaced satellites which might be employed in the method are the Astra 2A and Astra 2B satellites. (Astra is a Registered Trade Mark.) It can be shown that for these satellites with reception points in the United Kingdom, the angle subtended at each satellite between a line leading to the centre of the earth and a line leading to a point on the earth's surface at 50 degrees latitude is about 7.9 degrees, and that to a point at 60 degrees latitude is about 8.4 degrees. As the satellites are in fact separated in space, there is a difference in path length to a given point on the earth's surface for paths measured via these satellites. This difference in path length changes with the latitude of the point on the Earth surface. The variation in path length difference measured for a typical position of the Astra 2A and 2B satellites between points on the earth at 50 and 60 degrees latitude respectively is about 5 km. This is measurable.

The Astra constellation includes a third satellite Astra 2D. As this is also close but separated in space from the other two, it can be used in the same way with either of the other two to derive the variation in path length difference across the earth's surface at a different orientation to that computed from 2A and 2B. Ideally this orientation would be orthogonal to the one described earlier to break up the footprint in both a latitude and longitudinal variation. In practice it is not orthogonal but inclined; it is sufficient that the three satellites are not substantially aligned, i.e. they are non-linearly arranged as seen from the footprint.

Another group of closely-spaced satellites is comprised by the Eutelsat Hotbird Satellite cluster. (Eutelsat and Hotbird are Registered Trade Marks.) This includes five satellites, Hotbird 1 to 4 and 6, which are of particular interest since the cluster comprises pairs of satellites that lie on axes both perpendicular and approximately aligned with the "backbone" of the United Kingdom, enabling the footprint to be sub-divided in two mutually orthogonal directions by repeating the method with the two pairs of satellites.

A third cluster of satellites is the Astra 1 Constellation which includes the five satellites Astra 1B, 1C, 1E, 1F and 1H.

It should be noted that geostationary satellites are not actually stationary in the sky with respect to a point on the earth's surface, but in fact process around a fixed point. This is due to the inherent inclination of their orbits, which in turn results from the imperfectly spherical shape of the earth, and resulting asymmetrical gravitational forces. This leads to a changing constellation configuration, which results in slowly changing zoning. The way in which the path length is used, however, is not adversely affected by this changing configuration. The spatial distribution of the satellites within a cluster only has to be stable over period of key distribution, not content distribution. For geostationary clusters this should not be a limitation. Indeed the system uses the variation in satellite position to assist in the system security, since it is helpful in preventing a simple static relationship between the path length difference at two points on the earth surface measured over two satellites, as will be seen subsequently.

Reverting to FIG. 1, the basic operation of the system is as follows. In a first step, the satellite broadcast control centre 40 instructs the ground station 30 to signal to the satellites 10,12 that they are to transmit respective signals at the same frequency. Each receiver 50,50' then determines the phase difference between the two transmissions. Now in a second step, the control centre 40 again instructs the ground station 30 to signal to the satellites 10,12 that they are to transmit respective signals at the same frequency, but this time at a frequency that differs from the frequency used in the first step. This operation repeats, using a different frequency each time, for a predetermined number of steps, which may be in the range 8-2000 steps or preferably at least 50 steps. Typically there may be 64, 128 or 256 steps (i.e. frequencies) used. The number of steps and the size of the steps are chosen having regard to several factors. They both affect the total bandwidth requirement. If the step size is too small then the zone size that can be discriminated is too large. If the step size is too large then the codeword pattern that is obtained repeats too frequently, as discussed below.

The phase difference measured in each step is not changing over time, at least within the measurement period, and thus the result is not time critical.

Figure 3:
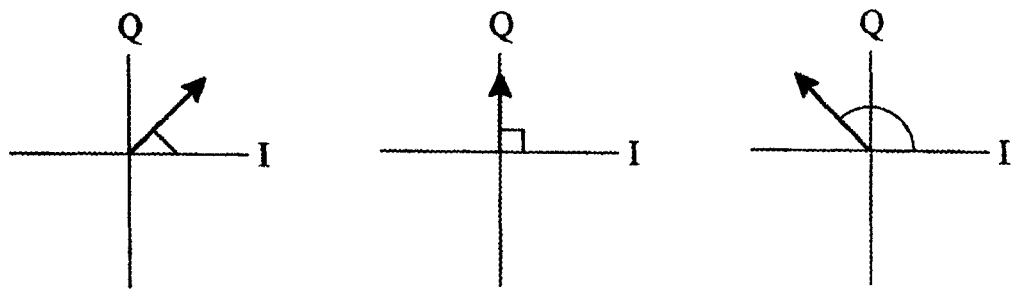
FIG. 3 illustrates the effects of changing frequency on the detected differential phase components of the transmitted key signal.
Figure 3:
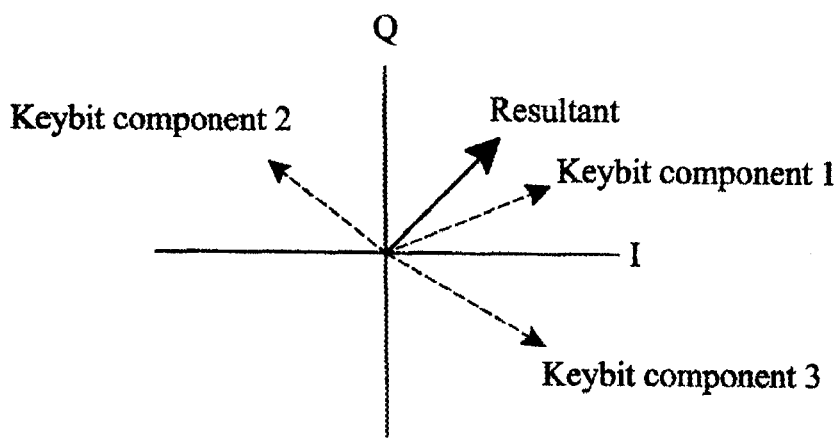
Figure 3:
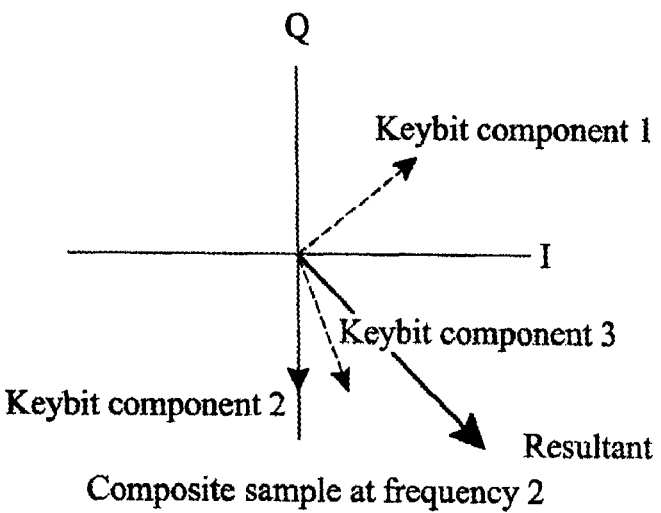

In each step, each receiver generates an output dependent upon the phase difference between the received satellite signals. For a given stationary receiver, these samples will show a phase progression over the entire sequence of received phase-demodulated samples. This is shown diagrammatically in the vector phase diagram in the upper part of FIG. 3 for three consecutive frequencies. Two receivers based at different points on the earth's surface will detect a different phase progression based upon their relative separation.

The phase difference observed at each frequency cycles around the possible values between 0-2π across the footprint, due to the change in path length difference because of the different angle X (see FIG. 2) across the footprint. There are therefore, ambiguities across the footprint when only one frequency transmission is considered, and this is related to the single-frequency wavelength. However, the cycle length for different frequencies is itself different, and the overall repeating cycle length, taking into account the many different relative cycle lengths from several frequencies, is much greater than any of the individual wavelengths. Indeed it is the difference in transmitted frequencies rather than the frequencies themselves that controls the extent of the ambiguities across the footprint. The different frequencies used in the preferred embodiment of the invention are discussed separately below.

The resultant outputs can be used to form the descrambling key at each receiver. This is preferably not done directly, but only after further processing, for reasons and in the manner described below.

The transmitted television programme needs to use a scrambling key that corresponds to the descrambling key generated at the receivers. This is not predicted or generated at the control centre in the conventional way. Rather, a feedback loop is included in the form of the land lines 52 (FIG. 1) connecting selected ones 50' of the receivers to the control centre 40. These selected receivers, the locations of which are known to the control centre, thus tell the control centre what descrambling keys are being generated by the receivers in each sector or zone, and the control centre can thus determine what scrambling key to use for a service which is destined for that zone. Receivers in other zones will generate a different descrambling key and will not be able to receive the service.

In fact, the broadcaster will transmit the encrypted content control words under encryption with a combination of the broadcast key as received by the receivers in the target sector or zone and a secret key shared across the system as a whole.

The structure of the control centre and a typical receiver will be described below. The satellites and the ground station are conventional and need no modification in order to operate in accordance with the invention.

Operation

The steps involved in the operation of the system illustrated in FIG. 1 will now be set out.

Steps 1 to 6 of the operation below can be repeated and are described here as a 'round' since their execution results in a multi-bit keyword being derived in the receiver. However, in order to overcome any deficiencies resulting from a single round, these can be repeated and the outputs from each round combined as described in the later steps below. The operations in a single round are summarised in FIG. 4 and described below.

1. First a signal at the reference frequency f1 is transmitted from the broadcast key control centre 40 via the first satellite 10 to the receivers 50,50' in the footprint 20, modulated onto the radio frequency (RF) signal emitted by a transponder (not shown) in the satellite. This constitutes the reference signal.

2. Each receiver locks a phase oscillator in the receiver to the incoming signal. In the system as a whole there is now a distribution of reference oscillator clock phases varying along the received path length of the transmitted signal at each respective receiver.

3. Next a signal at the same frequency f1 is transmitted from the second satellite 12, this also being modulated on to the transponder RF signal. As it is along a different transmission path, this becomes the measurement signal.

The measurement signal f1 transmitted from the second satellite 12 as described above is phase related to the reference frequency f1 transmitted from the first satellite 10. Ideally the two frequencies should be in-phase at the common source, based within the broadcast key control centre 40. By this arrangement the correct phase relationship can be assured between all subsequent transmissions of reference and measurement signals on any common frequency f.

Figure 4:
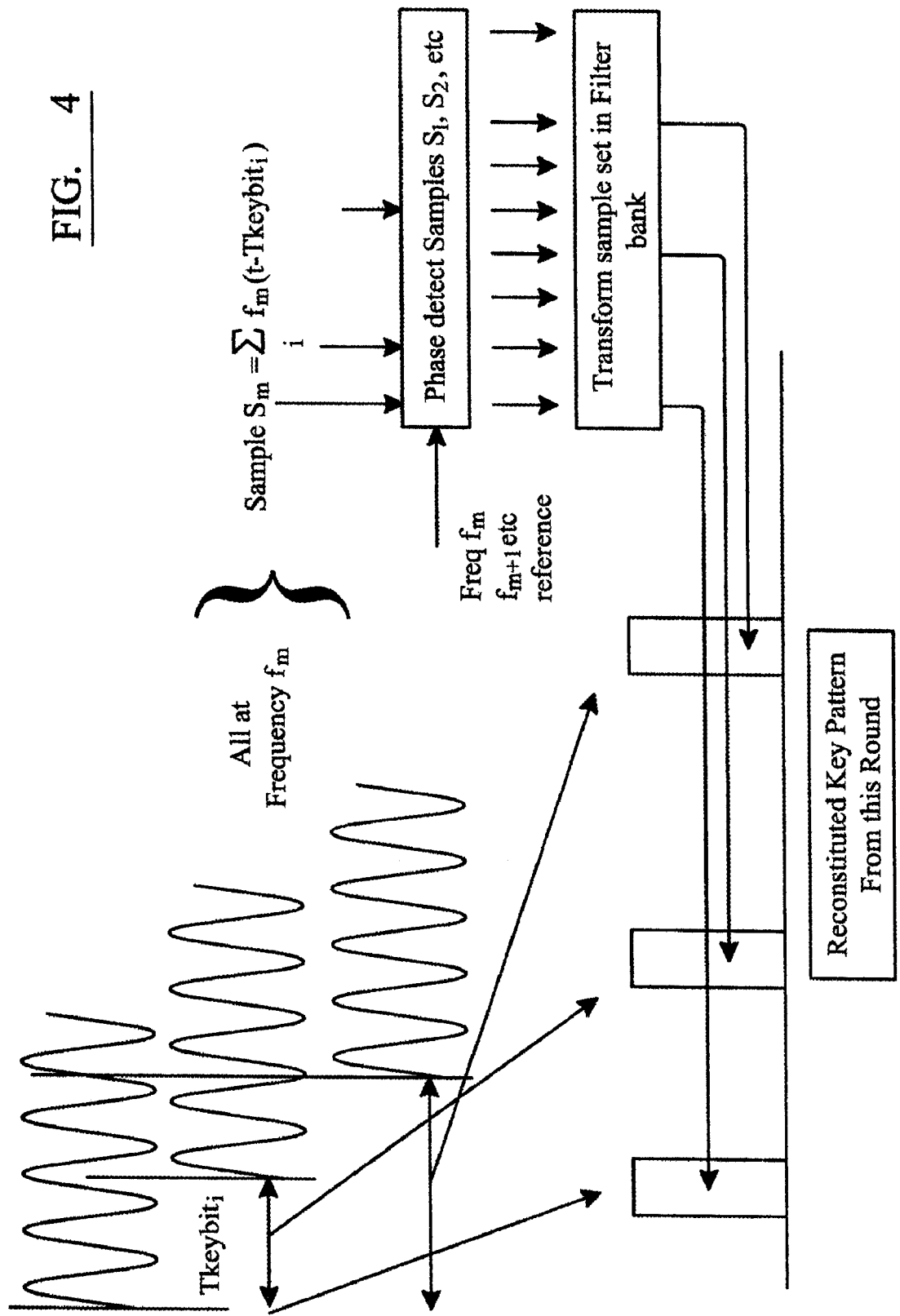
FIG. 4 illustrates a compound transmission signal that may be transmitted from the satellites in the system of FIG. 1.

In the preferred embodiment of the invention, the measurement signal f1 conveys not only a single phase reference with respect to the reference signal, but a number of individual phase references combined within the transmitted measurement signal. Each of these component phase reference signals corresponds to part of the energy of each of the conveyed bits (referred to here as keybits) derived within the receiver in the stages described below. Thus in the preferred embodiment, the simple 'in phase' reference signal is only one component (corresponding to one keybit, say keybit 1). Other keybits can be incorporated as shown in FIG. 4, by summing the time-delayed frequencies. The time delays, shown in FIG. 4 as Tkeybit, are specific values corresponding to the individual keybits derived within the receiver. These time delays are maintained throughout the subsequent reference-measurement transmissions at other frequencies in this 'round' of operations described in the first six steps enumerated here. Note that summing components in this manner causes the phase and amplitude of the resulting measurement transmission to vary across each frequency within the round. Note also that keybit1 as described by the 'in-phase' component need not be included in any given round of transmissions. An example vector phase diagram for the case of a number of key components is shown in the middle and lower parts of FIG. 3 for two consecutive frequencies.

4. Each receiver uses the reference signal from step 2 to demodulate and capture the relative phase of the resulting baseband signal. This result is not time critical; it is a constant complex value $Re^{j\theta}$, where θ varies with the difference in the relative path length between the two satellites and is not changing over time. This is shown in FIG. 4 as 'phase detect samples'. Here measurement frequency fm is received as a complex sample Sm and phase and amplitude are detected with the reference signal fm. This sample is then available for input to a transform process.

5. Steps 1 to 4 are now repeated over a set of frequencies f2, f3, f4 ... fm in the manner of a step frequency waveform. This is shown in FIG. 4 by the number of samples Sm being subsequently phase and amplitude detected with corresponding reference signals fm. Typically the total number of frequency samples M can be 64, 128, or 256 such transmissions.

6. Each receiver performs an inverse discrete Fourier transform (DFT), or similar digital filtering operation, that is matched to the form of transmission step frequency pattern in order to detect specific phase progression patterns on the set of measured complex numbers. This is shown in FIG. 4 in which a uniform step frequency waveform has been assumed. The transform process here is a regular Discrete Fourier Transform that takes in the M complex samples that together represent (strictly, the inverse transform of) the multi-bit output word, and transforms these samples to determine the output multi-bit word of this round. In fact the summation of the bits in air can be seen to be the forward transform process of the originating multi-bit word at the broadcast centre. For the more general case of a non-uniform step frequency waveform, a different transform process is required in the receiver. Whether the filter coefficients are permanent or upgradeable dynamically over air is a matter for the implementation. The resulting output becomes an M-length key, the value of which is shared by its immediate neighbours.

7. The process described in steps 1 to 5 can optionally be repeated for a new set of frequency values f1, f2, f3, f4 ... fm in a separate round. The output of the DFT is now combined with the corresponding points of the previous iteration. This can occur a plurality of times, depending on the implementation. The final summed sequence is combined with an amplitude threshold to derive a binary 'key' sequence.

8. Selected receivers in the field contact the broadcaster with the received key sequence by means of land-lines 52 as shown in FIG. 1. These receivers could be based in private homes, regional centres, etc., depending on the system configuration and requirements.

9. The broadcaster transmits the encrypted content control words. They are encrypted with a combination of the broadcast key as received by the target receiver cluster at the time of the key distribution, and 'secret' key shared across the system. The time of content broadcast can in principle be any time after the time of key evaluation.

Thus in the preferred system described, a plurality of trusted devices in the field are addressed, these being the receivers 50. Each trusted device requires some other base key that, when combined with the evaluated regional key, can be used to unlock the encrypted broadcast content. This counters problems produced when an eavesdropper decodes the transmitted key and publishes it directly, e.g. on the internet. The use of trusted clients does not render the technique useless or obsolete, since the trusted component need not be regional, and the device, if mobile, will operate in a trusted manner for the region it finds itself in. The issue of illegally exporting smart cards or devices is thus effectively countered. The problems of issuing smart cards are thereby simplified.

In the case of a system implementation not incorporating a secret key, the 'regionality' of the broadcast keys means that both content and derived keys (e.g. from a 'non-authenticated' key decoder) from the same region would have to be transferred across regional boundaries. However, it is then more likely that a key decoder would be arranged to decode the content, and release it in unscrambled form without the need for any accompanying keys.

Control Centre

Figure 5:
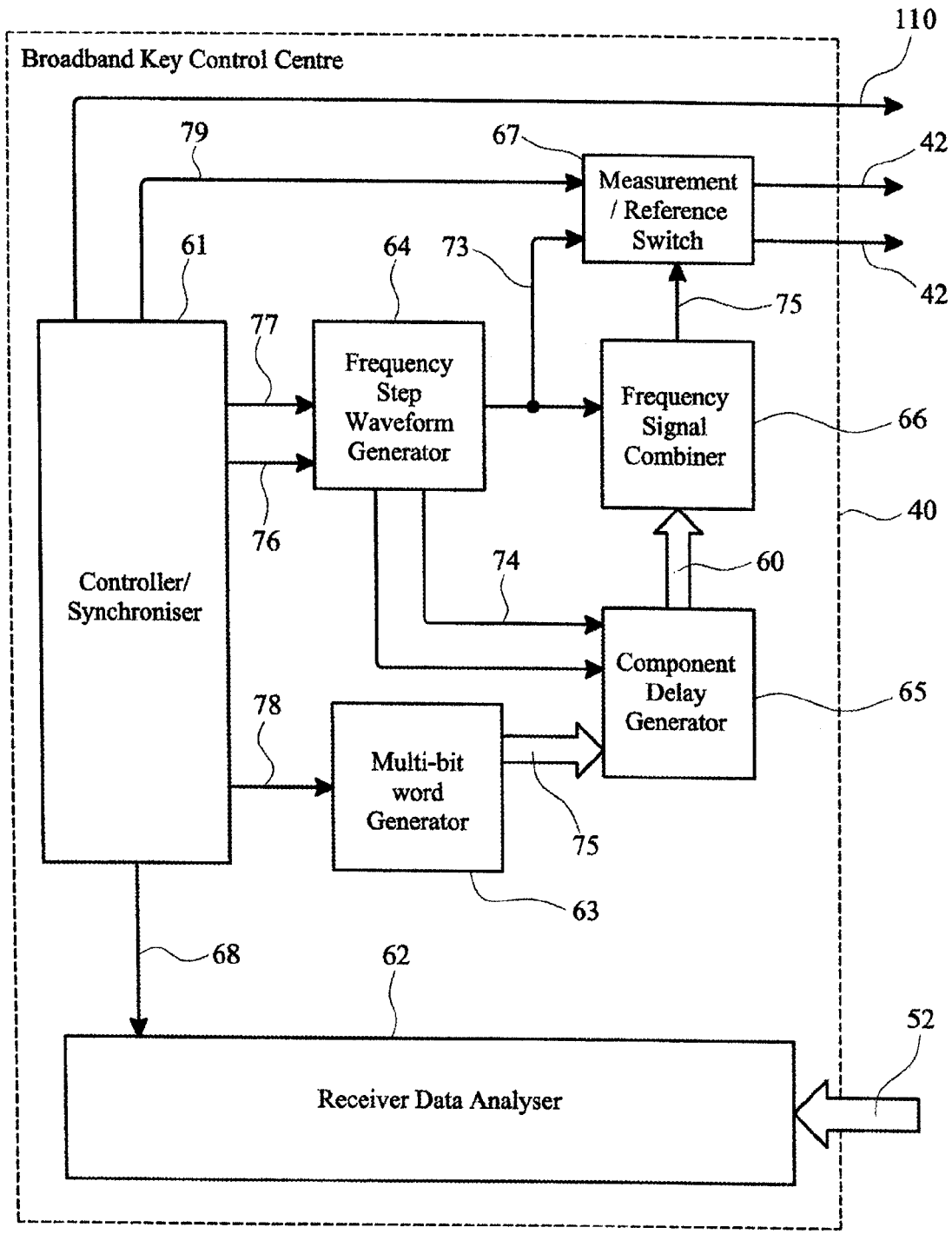
FIG. 5 is a block diagram showing the construction of the control centre in the system of FIG. 1.

Reference is now made to FIG. 5, which shows in block diagram form the construction of the relevant part of the control centre 40.

The broadcast key control centre 40 includes a controller and synchronisation system 61 that synchronises the operation of the other sub-components within the control centre and, through generation of the framing protocol 110, timely operation of the receiver functions. In addition to the coordination of the signal generating sub-components, the controller is also used to signal over a signal path 68 to a receiver data analyser 62 the periods in which the incoming data on the feedback lines 52 from the feedback receivers 50' will be stable.

The control centre 40 also includes a multi-bit word generator 63 connected by a line 78 to an output of the controller, and a frequency step waveform generator 64 connected by lines 76 and 77 to outputs of the controller. A component delay generator 65 is connected to receive the output of the multi-bit word generator 63 over signal path 75 and to receive outputs from the frequency step waveform generator 64 over signal pair 74. A frequency signal combiner 66 receives outputs from the component delay generator 65 over signal path 60 and also an output from the frequency step waveform generator 64 over signal path 73. Finally a measurement/reference switch 67 receives the output of the frequency signal combiner over signal path 75, the signal on signal path 73 from the frequency step waveform generator 64, and a signal on signal path 79 from the controller 61, and provides outputs at 42.

The operation of the control centre can be described using the 'rounds' described earlier. For each round, a multi-bit word and a set of waveform parameters are required. The controller 61 signals the initiation of these to the waveform generator 64 and the multi-bit word generator 63, respectively, as shown through signal paths 76 and 78. The parameters used within these respective sub-components depend upon the overall system geometry and the resolution required for the specific deployment. The number of rounds within a complete key generation cycle is controlled by the controller 61 through signalling to the sub-components and receivers.

The component delay generator 65 is the sub-component responsible for determining the relative delays between the components required to convey the multi-bit word in the composite measurement signal. This process was illustrated in FIG. 4 and the respective delays denoted Tkeybit. These values are dependent upon the multi-bit word to be conveyed, frequency step size and number of steps. These parameters are signalled from the multi-bit word generator 63 and the frequency step waveform generator 64 respectively as shown by signal paths 75 and signal pair 74. Values of Tkeybit in seconds can be determined using:

$$Tkeybit = I \cdot /M\Delta F$$

where I is the keybit value (1 . . . M) and ΔF is the step frequency value in Hz.

The frequency step waveform generator 64 then generates a representation of a sinusoidal frequency at the first transmitted frequency. This is passed unmodified to the measurement/reference switch 67 through path 73. During the reference phase of operation, the unmodified frequency is passed through to satellite 10 as the reference signal through the appropriate line 42, as controlled by the controller over line 79. At the same time, the same frequency is passed along line 73 to the frequency signal combiner 66 which sums the delayed versions of the frequency, as shown in FIG. 4, using Tkeybit values passed from the component delay generator 65. The output of the frequency signal combiner 66 is also made available to the measurement/reference switch 67 for output to satellite 12 during the measurement phase of the operation, using the appropriate line 42, as controlled by the controller and signalled to the receivers by the framing protocol 110.

Note that it may be an implementation choice that the measurement/reference switch is not necessary and that both signals can be transmitted on their respective paths simultaneously, though the respective availability of the signals can still be signalled to the receiver as part of the framing protocol 110.

Subsequent generation of frequency transmissions, both as part of the current waveform round and for subsequent rounds, are signalled though the path 77 by the controller 61.

Receivers

Figure 6:
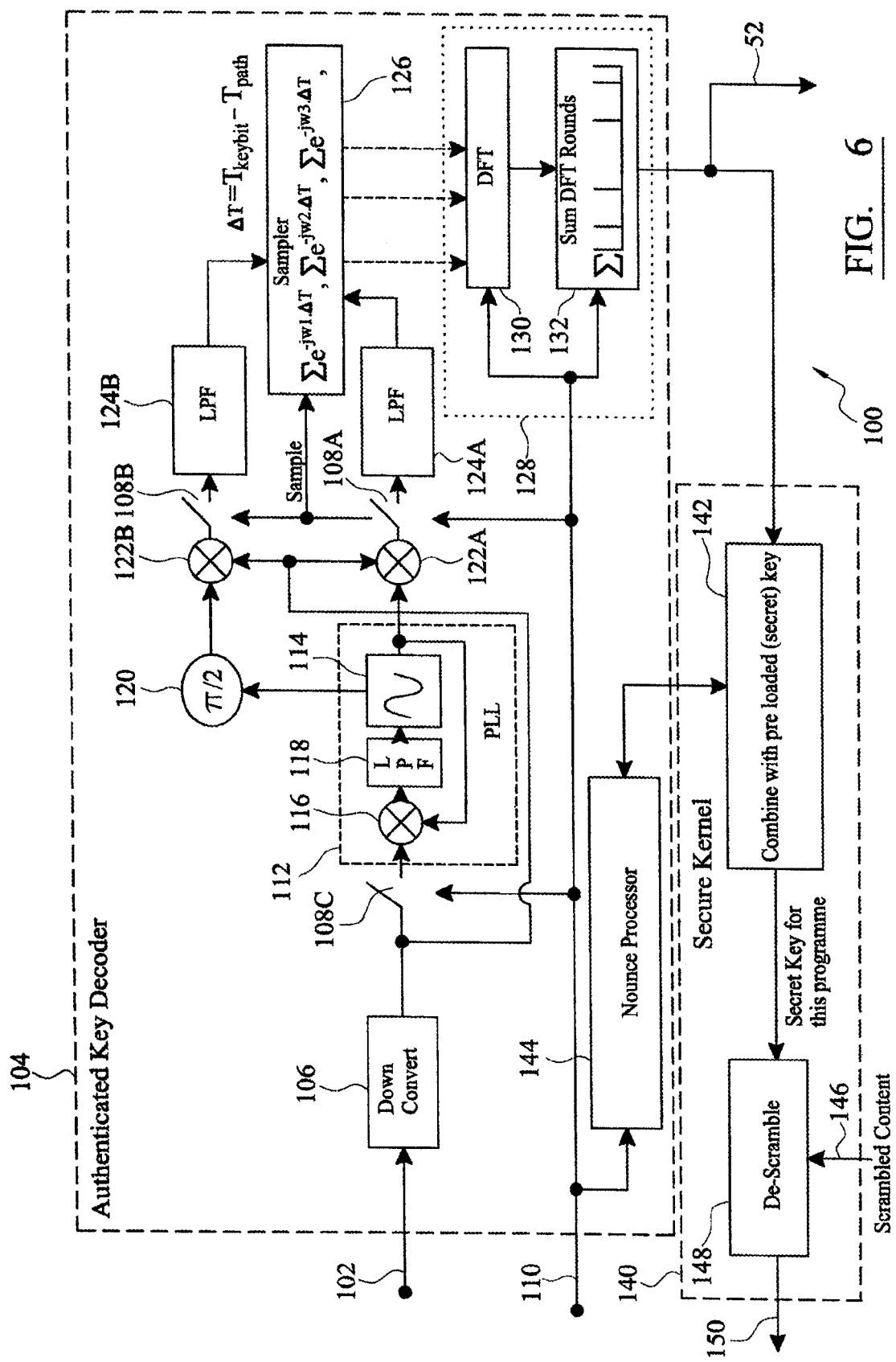
FIG. 6 is a block diagram showing the construction of a receiver for use in the system of FIG. 1.

The relevant part of the circuitry 100 of one of the receivers 50,50' is illustrated in FIG. 6. This block diagram assumes analogue components to describe the receiver functionality. However, alternative implementations using digital components or discrete signal parameters are equally possible.

In the receiver circuitry 100 shown in FIG. 6, the output of the R.F. (radio frequency) circuitry, which is of conventional form, is applied to an input 102 of an authenticated key decoder 104. In the decoder 104 the signals are first applied to a down-converter 106 where they are down-converted to base-band. The output of the down-converter 106 is then applied through the third contact element 108C of a switch 108. The switch 108, which has three contact elements 108A, 108B and 108C, is controlled by a framing control signal received at an input 110. The framing control signal defines inter alia two time periods, namely a first or reference time period and a second or measurement time period. During the first or reference time period a signal is received from the first satellite and during the second or measurement time period a signal is received from the second satellite. During the first time period the switch 108C is closed (conductive) and the signal from the first satellite after down-conversion is applied to a phase-locked loop (PLL) 112. The phase-locked loop is of conventional form and includes an oscillator 114, a phase comparator 116, and a low-pass filter 118. The output of the oscillator 114 is applied to one input of the phase comparator 116, the other input of which receives the output of the down-converter 106 as passed by the switch contact element 108C. The phase comparator provides an output dependent upon the magnitude of the phase difference between its two inputs, and this output is smoothed by the low-pass filter 118 before being used to control the frequency of the oscillator 114. Thus the phase-locked loop 112 acts as a clock controlled by the input signal received at input 102. During the reference time period, when switch 108C is closed, the phase-locked loop synchronises with the phase of the received signal from the first satellite.

The output of the phase-locked loop 112 is applied to a multiplier 122A and through a 90E or $\pi/2$ phase shift circuit 120 to a multiplier 122B. The phase-locked loop retains the phase acquired during the reference time period even subsequent to the reference time period, when the switch element 108C is opened (non-conductive). The receiver then receives a signal from the second satellite, this being regarded as a measurement signal. As switch element 108C is open, it does not affect the phase-locked loop 112. However it is passed to the other input of each of the multipliers or modulators 122A and 122B where it is multiplied respectively with the in-phase and quadrature-phase outputs of the phase-locked loop. The outputs of the multipliers are applied through the first and second switch contact elements 108A and 108B of the switch 108, which are open (non-conductive) during the reference time period but are now closed during the measurement time period.

Thus, the system "captures" the phase of the reference signal through the phase alignment of a steerable local oscillator, namely the PLL loop 112, which can run free in the absence of a driving signal reference during the reception of the measurement signal. The requirement for stability of the PLL oscillator in the absence of the driving signal is not severe, since the time between the opening of the switch elements 108C and the sample point during the subsequent measurement transmission may only be less than a second.

In an alternative arrangement, two RF paths are provided so that the receiver can simultaneously tune to the reference and measurement transmissions.

The precise way in which the phase is captured can differ from the arrangement of multipliers 122 described, which is simply a simple one of many possible ways to extract the phase.

The signals from the multipliers 122A and 122B, having been passed by the switch contact elements 108A and 108B, are applied to respective low-pass filters 124A and 124B and thence to a sampler 126.

The sampler 126 is essentially a store that holds a value corresponding to the phase difference between the reference and measurement signals. Because during the reference phase the phase-locked loop 112 is brought into phase synchronism with the reference signal, the output of PLL 112 will be in phase synchronism with the reference signal. When the measurement signal is being received, switch element 108C opens and PLL 112 continues to oscillate with the same phase as the reference signal. The measurement signal is applied to the in-phase (I) and quadrature-phase (Q) modulators 122A and 122B, the outputs of which will thus be determined by the relative phase or phase difference between the reference and measurement signals.

A sampling instant, at which the I and Q phase derived from the comparison of the measurement and phase signals can be captured and stored in this way, is signalled by the framing protocol, described below. The resulting sample corresponds to one input point in the M-point transform process that follows. There is much tolerance in the positioning of the sample instant, since the output of the I and Q filters is ideally stable and static.

As described below, successive transmissions are made at a plurality of frequencies. A respective phase difference value is generated as described above at each of these frequencies. These values are held in the sampler 126 for each of the different frequencies.

In the preferred embodiment of the invention illustrated, a compound signal is transmitted during the second or measurement time period. This compound signal is composed of a number of delayed signal components as illustrated in FIG. 4. Each of the delayed signal components is interpreted by the receiver as an independent signal with a different differential path length, and so they will form what can be used as a multi-bit digital key structure. The delay between each component causes the energy within that component in a separate "filter bank" output, thereby discriminating each component as a key component element on the output.

Consequently each sample $S_m$ can be seen as a summation:

$$S_m = \Sigma f_m(t - T\mathrm{keybit}_i)$$

where $T\mathrm{keybit}_i$ is the delay of the ith component at the frequency $f_m$, as seen in FIG. 4 and the summation is over i. The output of the sampler 126 thus consists of a plurality of samples equal in number to the number M of frequencies used in the transmission. These samples $S_1, S_2, S_3 \ldots S_M$ are not used directly but are subjected to further processing at 128, as described below. For this purpose the samples are applied to a Discrete Fourier Transform (DFT) circuit 130, the output of which is applied to a summation circuit or aggregator 132.

Once a sequence of M points has been captured from the M cycles of reference and measurement transmissions following M successive sample instants, they can be transformed through a digital signal processing algorithm (here the DFT). As described below, the value M may be signalled dynamically, or be determined in another manner dependent upon the particular implementation.

For purposes of explanation, the filter analysis within the receiver considered here by way of example is the DFT. Conceptually this can be thought of as a bank of M filters in which each constituent filter gives one output sample for n input samples. The filter bank 126 as a whole then produces the M outputs $S_1, S_2, S_3 \ldots S_M$, considered herein to be the 'filter output profile'.

The aggregator 132 is included in order to sum a number of rounds of measurement cycles. This is described in more detail below, and obfuscates the codeword and removes cyclical repetition. The number J of such rounds may be set as part of the framing protocol, as described below.

In the aggregator, the M-point output from the DFT filter bank is stored and aggregated with subsequent rounds within an entire word transmission process. The aggregator can be used to achieve this combining, and a number of suitable implementations are possible. In the preferred embodiment of the invention, an amplitude threshold is applied during each round to establish a binary word. This binary word can then be logically combined (e.g. ORed) with the respective outputs from other words derived from the other rounds in the sequence. It is a matter of design implementation to ensure that the choice of multi-bit word transmitted during each round and the combination of other system parameters lead to a set of unique received multi-bit words for each sector to be differentiated. A simple method to ensure this is to concatenate the binarised (amplitude detected) filter outputs at each round rather than sum them as an alternative aggregation method.

The output of the aggregator 132, constituting the output of the processing block 128, thus provides the broadcast location key for the current programme. In the selected receivers 50', this is fed back over a secure authenticated land-line link 52 to the control centre 40, as shown in FIG. 1. The information fed back includes the identity of the receiver, the time, and data integrity information, as well as the broadcast location key.

In all the receivers 50 and 50' the broadcast location key is applied to a so-called secure kernel 140, where it is combined with a pre-loaded secret key in a circuit 142. The secure kernel is not easily accessible to consumer hacking. The structure of this part of the receiver will be well known to those skilled in the art and is not, therefore, described in detail. Briefly, the circuit 142 is coupled by a two-way connection to a so-called nonce processor 144 in the authenticated key decoder 104, which detects header information for signal integrity confirmation. The secret key from the circuit 142 is applied to a descrambler 148 which receives at an input 146 the broadcast content protected by a known scrambling algorithm, and provides a descrambled or clear output 150, that is, content which has undergone the inverse scrambling process. The secure kernel represents that part of the operating system which is robustly secure according to general industrial practice, i.e. not easily accessible to consumer hacking. It is typically the area assigned with the storage and manipulation of the secre The combination with a secure key in the circuit 142 ensures that only trusted receivers have access to the broadcast content. This has several advantages:

1. reception of the broadcast key by a non-authenticated decoder, or through key distribution such as over the internet, is not sufficient to descramble the broadcast content;

2. a receiver will respond appropriately when moved to a region where it cannot legitimately receive broadcast transmissions, even though it may have physical access. This is because trusted devices use authenticated key decoders that are unable to derive the correct keys or receive key information from non-authenticated key decoders or internet sources;

3. the distribution of the stored secret key does not have to be regionally controlled;

4. the receiver does not have to declare its location, either to the broadcast system or to its owner, for correct regional operation. To that extent, the receiver does not actually 'know' where it is, but it is able to convey to the control centre sufficient information for the control centre to know how to scramble the signals which are to be sent to it and other receivers in the same zone; and 5. the inclusion of the secret key can be used as part of the compliance regime to ensure correct operation of the device as a whole including the key decoder, nonce processor and other peripheral security features. The absence of the static secret key is enough to prevent access to the content by a non-compliant device.

The nonce processor 144 reduces the likelihood of "replay" attacks over the internet. Replay attack is where an eavesdropper records data and then plays it back subsequently. To avoid this, the nonce processor checks on selected dynamic and timely sequence information in the broadcast content, e.g. broadcast (programme) number and date, to detect a monotonic increase. This thereby resists replay attack. This operation is in addition to other air-interface checking, such as may be provided through session keys or proprietary data-stream integrity-checking mechanisms.

The broadcast content may be obtained and stored by the receiver prior to the key acquisition operation, or may be delivered concurrently with or after the key acquisition, depending upon the complexity of the receiver and the system implementation.

Preferably, for greater security, the system does not, in fact, scramble the content with the secret key/broadcast key combination, but instead uses intermediate keys which themselves are part of a key hierarchy and can be encoded and transmitted. The secret key held in the receiver is then the top key in the key hierarchy. This avoids plaintext attacks on the shared secret key made possible through the availability of the broadcast key and in-the-clear content.

The effect of adding delay to the receiver input is something that always needs to be considered. Here it would affect both paths equally and so have no overall effect on the received key. It is worth noting that the technique could be abused by building a system in which the phase samples in the sampler of the receiver diagram of FIG. 6 have an additional time element added. However, this would only displace the apparent location of the device some fixed amount East, West, North or South. It is difficult to target such modifications with any accuracy, since the value of delay corresponding to a fixed displacement on the earth's surface depends upon the satellite configuration being utilised and the current location of the receiver. These problems are furthermore only comprehensively alleviated through the use of secret keys and compliance.

Framing protocol

The signal from which each receiver in the field derives the key material is divided into three parts, namely the reference signal, the measurement signal and the synchronisation/framing protocol.

In order to function correctly, it is necessary for the measurement and reference signals to arrive at the receiver through different routes. It is the nature of the difference in path lengths between these two signals, combined with other signal parameters, that results in the different key material derived at different points within the receiver footprint. It may also be the case that in a given implementation more than two satellites are employed, and this gives rise either to a number of measurement signals or to a number of measurement signal-reference signal combinations. Differences in implementations can be accommodated through the design of the framing protocol, which is designed for the specific implementation.

Although there is synchronisation between the component of the framing protocol and events in either the reference signal or the measurement signal, there is such tolerance in this synchronisation that it can be conveyed over either signal, or possibly by an alternative channel. However, for ease of implementation, it is likely to be conveyed simultaneously over both the reference and measurement signals, or switched between both, coincident with the active (reference or measurement) transmission phase.

Referring again to FIG. 6, to co-ordinate the timing of the decoder, the framing protocol is received at an input 110 along with the transmitted signal from the satellites. The framing protocol is extracted by any suitable separation circuit of known type. The framing protocol controls the switch 108 and is also applied to the nonce processor 144. Finally, it is applied to control the timing of the sampler 126 and the processing circuitry 128. More particularly, the framing protocol conveys at least the following information:

1. The location of the nonce header information for signal integrity confirmation.

2. The timing of the active part of the transmission reference signal, for resetting the stored reference phase of the receiver internal state. This may also entail switching the input transmission path of the receiver in order to retune it to the current reference transmission. The details of this transmission may be part of the information coded into the framing protocol, or may have been conveyed by some other means. The resetting of the stored phase in the receiver is shown in FIG. 6 by closing the switch element 108C and opening switch elements 108A and 108B.

3. The timing of the active part of the transmission measurement signal, for determining the differential phase between the stored reference phase in the receiver and the phase of the current measurement signal. This may also entail switching the input transmission path of the receiver in order to retune it to the current measurement transmission. The details of this transmission may be part of the information coded into the framing protocol, or may have been conveyed by some other means. The determination of the differential phase is shown in FIG. 6 by opening the switch element 108C and closing switch elements 108A and 108B.

4. The timing of the capturing of the differential phase measurement. This is shown in FIG. 6 as the "sample" input to the sampler 126.

5. The timing of the transformation of the last phase samples input to the DFT 130. This is illustrated on FIG. 6 by the connection to the DFT circuit. There are M samples equal in number to the number of separate frequencies transmitted. The value of M either can be conveyed along with the framing protocol, or can be known through some other means, or can be an implementation constant for the system.

6. The assignment of a code representing the broadcast key identification (ID) that is being constructed, to allow association of this key with the content item, data stream, or service.

The framing protocol may optionally also convey encrypted key data or session keys which, when combined with the stored decrypted secret key and also combined with the broadcast key can be used to decrypt the content.

In order to remove the relationship between the reception of key material by geographically-dispersed receivers due to the regular nature brought about by linear-step frequency processing, the system sums a number of 'rounds' of measurement-transform cycles. This enables the parameters to be different within each 'round'. The effect applies differently to receivers that are physically dispersed. The number of rounds 'J' to be aggregated on a point-by-point basis may be a dynamic system variable to be signalled though the framing protocol, or may be determined in another implementation-dependent manner. The nature of the aggregation is not of particular importance. It could be implemented as a logical function including XOR (exclusive-OR), or be a concatenation of the different rounds.

Thus where, as shown, aggregator 132 is included in the system in order to sum a number of rounds of measurement cycles, the framing protocol also conveys the timing of the last J sets of transformed samples held in the aggregator 132. This is illustrated on FIG. 6 by the connection to the aggregator 132. As noted above, there are J cycles of measurement operations, which are aggregated in the aggregator. The value of J either can be conveyed along with the framing protocol, or can be known through some other means, or can be an implementation constant for the system.

Frequency Steps

The measurement and reference signals are of the same form. As described above, measurements are made of the phase difference at more than one transmission frequency. Preferably the measurements should be made at a series of frequency steps. Thus in the preferred embodiment the reference and measurement transmissions are step frequency waveforms, the exact parameters of which depend upon the system implementation, the number of satellites, the size of the footprint, the number of partitions required, and the available transmission system bandwidth. However, the receiver circuit as described does not require a priori knowledge of these parameters, as these settings have no effect upon the receiver operation. The overall effect resulting from a particular choice of parameters is determined and observed by the system broadcast key control centre.

When carrying out digital filter analysis over the samples collected over a number of such frequency steps, the resulting profile (the output filter samples) represents the components of the measurement signal discriminated by their respective delays with respect to the reference signal. The resolution of this discrimination (the amount of delay between components that can be separated through such coherent filtering) depends upon the size of the frequency step (Hz), and the number of steps within the whole sequence, and hence the total system bandwidth. When using Si units of Hz, meters, seconds, it is convenient to consider the filter output profile to be a range profile (range discrimination profile), since the resolution of the output components is observed in units of meters. Note, however, that this is not a distance on the earth's surface.

By way of example the case of a uniform frequency progression will be described in detail. However, other forms of frequency progression that are non-uniform can be used. In the case of a uniform frequency progression, for a frequency step $\Delta F$, over n successive measurements and with a resolution bandwidth of $n\Delta F$, the simple discrete Fourier transform (with no amplitude tapering) corresponds to the following range discrimination profile (m) along the differential path length plane:

$$0, c/n\cdot\Delta F, 2\cdot c/n\cdot\Delta F, 3\cdot c/n\cdot\Delta F, 4\cdot c/n\cdot\Delta F \ldots (n-1)\cdot c/n\cdot\Delta F$$

So, for example, in a first instance with $\Delta F$ of 10 kHz, n=128, and with the speed of light c=$3.10^8$ m/s, the differential path range discrimination profile is:

$$0, 234 \text{ m}, 468 \text{ m}, 702 \text{ m}, \ldots 30 \text{ km}$$

and in a second instance with $\Delta F$ of 1 kHz, n=128, c=$3.10^8$ m/s, the range profile is:

$$0, 2343 \text{ m}, 4686 \text{ m}, 7029 \text{ m} \ldots 300 \text{ km}.$$

Now, ambiguity occurs after a differential path range d where d=$c/\Delta F\cdot(m)$. In the above instances figures this was 30 km and 300 km respectively.

The smallest differential path range $d^1$ to be resolved is given by phase change of $2\pi$ over n observations separated by $\Delta F$ where:

$$d^1=c/n\Delta F\cdot(m)$$

So with the above-instanced figures this was 234 m and 2343 m respectively. Note that $n\Delta F$ (Hz) is the available system bandwidth.

The components of the measurement are separated at the output of the filter bank or sampler 126 by virtue of their respective delays with respect to the reference signal. This delay is introduced in two places. At the transmission end, components can be separated such that all receivers receive a multi-output sequence from the filter bank, as described above with reference to FIG. 4. Also, since the receivers themselves are at various differential path lengths due to the geometry of the footprint, their individual profiles are also affected.

Area Discrimination and Sectors/Zones

Satellites that are separated by horizontal or vertical displacements give rise to discrimination in longitude or latitude. That is to say the sectors or zones are approximately aligned with the lines of longitude and latitude. The width and length of these zones can be selected by choosing the frequency step size appropriately. This then allows controlled regional key distribution to receivers on areas bounded in latitude and longitude. A number of substantially co-located satellites, say three or more, are required for both horizontal and vertical (as seen on a map, i.e. north-south) resolution.

Figure 7:
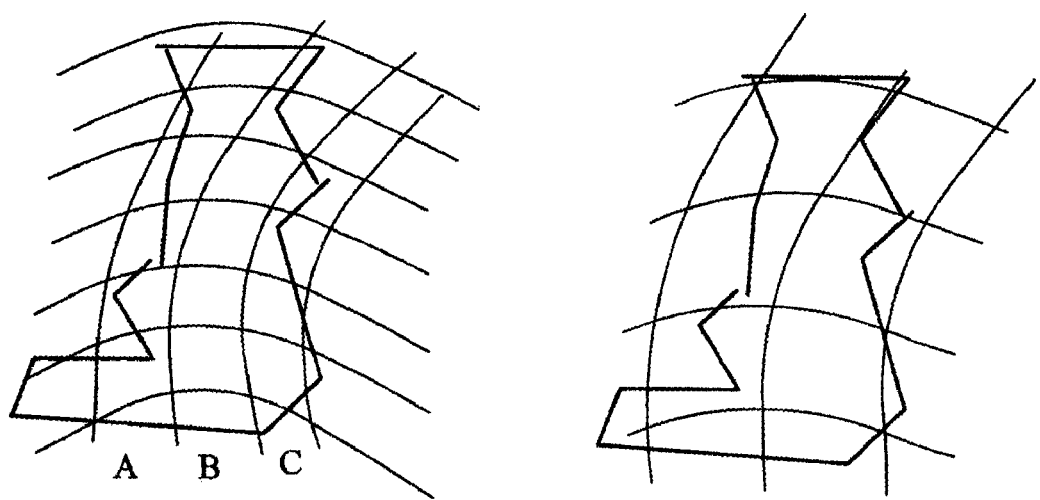
FIG. 7 is a view illustrating how the sectors might fall across part of the earth's surface, here the United Kingdom.

This is illustrated in FIG. 7, which includes two diagrams outlining the United Kingdom. In the right-hand diagram the UK is divided into three sectors horizontally and five sectors vertically. In the left-hand diagram it is divided into five sectors horizontally and seven sectors vertically. The difference is achieved by using a different frequency step size, i.e. different waveform parameters. The figure can be looked at in two different ways. In the first, the lines shown in the above figure correspond to a resolution width corresponding to the width of each filter within the receiver filter bank, i.e. they define the zones shown in FIG. 1. The different zones are separated through a single cyclic shift of the received key pattern in each adjacent zone. For this simple case, the straightforward relationship between adjacent stripes can be reduced through the use of techniques described below.

Alternatively, in the second way of viewing FIG. 7, the lines can be considered as corresponding to the whole of the total excursion across the whole filter bank, i.e. to the whole complement of sectors, which is repeated in each stripe. In this second case, there is a much higher system bandwidth requirement. However differentiation between zones can then be achieved by combining the filter outputs from a number of 'rounds' using uniform step frequencies of different frequency step size.

Figure 8:
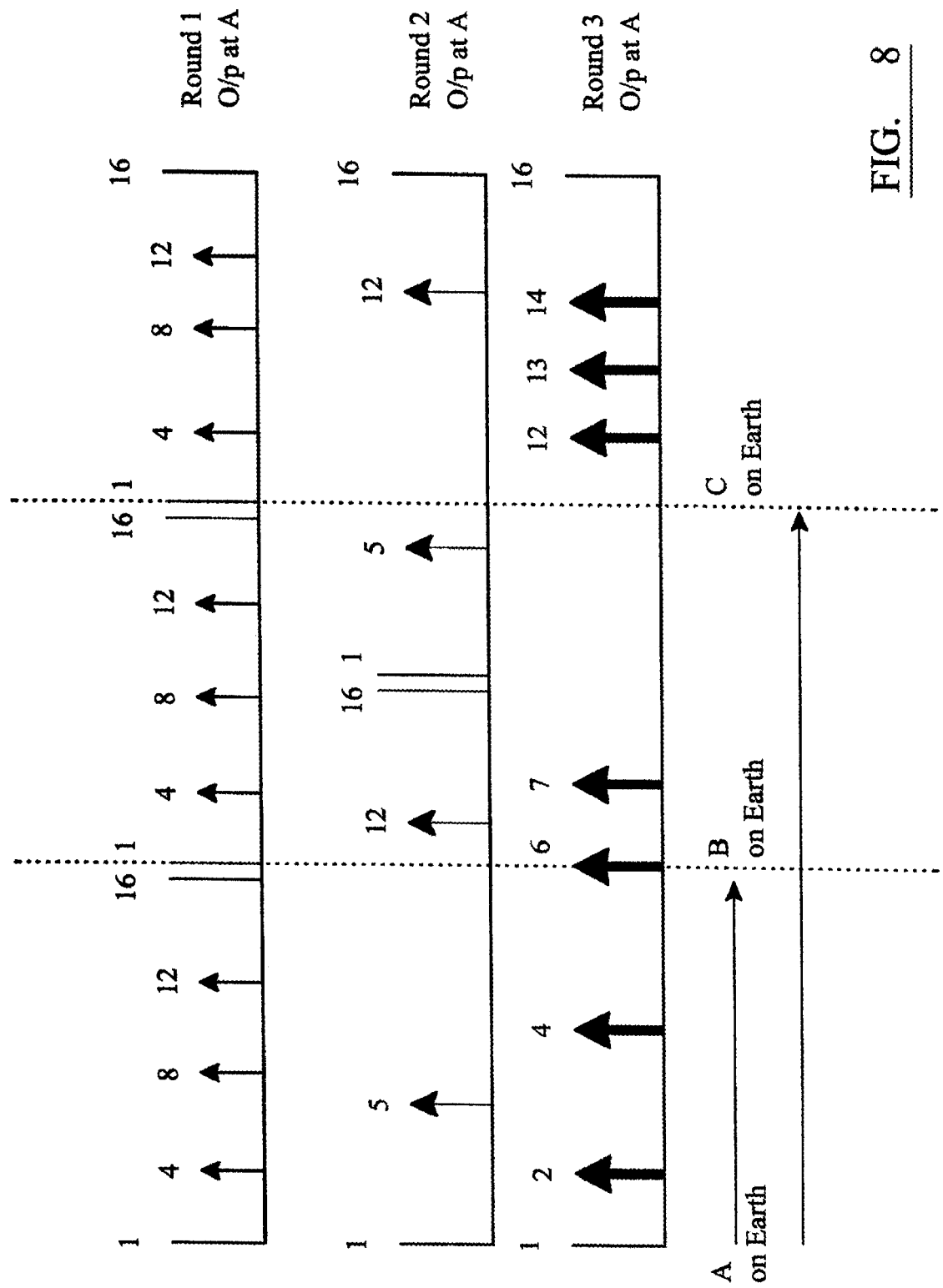
FIG. 8 illustrates successive rounds of operation of the system in an instance such as shown in FIG. 7, showing the displacement between three receivers compared with spacings across a filter bank in the receivers.

This is achieved as follows. Reference is made to FIG. 8. Consider resolution of stripes A, B and C. Consider the case of a step frequency waveform comprising 16 steps. In the first round shown figuratively as round 1, the high step size results in a small zone width corresponding to vertical stripes A, B and C. The 16 points give 16 points within each zone and these are narrow as a result of the high bandwidth. Note that the filters within the 16 point filter bank are referred to using their position within the bank from filter 1 (the smallest phase change resolvable at each step) to M, (the largest resolvable phase change).

Now consider three receivers, A B and C, each physically located on the left hand zone line of stripes A, B and C, respectively, such that each receives exactly the same sequence. Those at the higher differential path length see the lower image 'wrapped around' 16 filters, i.e. they incur an extra $2\pi$ radians in the step phase measurement, and so give an identical output to a filter placed in the corresponding position in another zone. In this round, point B is physically displaced from A by a differential path width corresponding to 16 filter widths (1 whole bank) and point C by 32 (2 banks). In the first round, the key pattern for a receiver A could be received in filters 4, 8, 12 as shown schematically by the top diagram. A receiver in the corresponding position in B and C receive the same bit pattern, 4, 8, 12 since they are one bank and two banks displaced respectively. In the second round, also 16 points, a lower frequency step is employed with the foldover region physically somewhere in the middle of region B, approximately equidistance between points B and C. The resolution is lower (the key bits are wider). The receiver representing the position in A now receives keybits in position 5 and 12. As round two has a different frequency step size to round one, the receiver at B is no longer in the equivalent electrical position as the point A, but is now displaced by 10 keybit positions, as shown by the dotted line passing through filter 11. Thus it sees the same key pattern as A but shifted 10 places modulo 16. This results in a key pattern at 5+10 and 12+10 (mod 16)=filter numbers 15 and 6 respectively.

The receiver in C is also no longer in the equivalent electrical position to A or B, but is now displaced by 22 keybit positions (mapping filter 1 onto filter 6 after mod 16), from A, as shown by the dotted line, and is thus seeing the same key pattern as A but shifted 5 places modulo 16. This results in a key pattern at 5+5 and 12+5 (mod 16)=10 and 1 respectively.

For the third round, the unambiguous region resulting from the choice of waveform parameters covers the width of the UK once only. It still uses 16 points, with even lower resolution in terms of physical displacement represented by the adjacent filters in the filter bank. Receiver A receives keybits from filter bank outputs 2, 4, 6, 7, 12, 13 14. At this low resolution, receiver B now is relatively displaced by 5 key bit spaces as shown by the line passing though filter 6, so receives the same sequence as 7, 9, 11, 12, 1, 2, and 3, accounting for the wrap-around (modulo 16). Receiver C is relatively displaced by 10 key bit spaces, mapping an output at A in position 1 to that at C in position 11, shown by the dotted line. The receiver at C receives the shifted sequence as 12, 14, 16, 1, 6, 7, and 8, accounting for the wrap-around (modulo 16).

If the outputs from the three rounds are aggregated (in this case using ex-OR), then:

Receiver $A$ has 4, 8, 12, +5, 12, +2, 4, 6, 7, 12, 13,
   14=2, 5, 6, 7, 8, 12, 13, 14=0100111100011100

Receiver $B$ has 4, 8, 12, +15,
   6, +7, 9, 11, 12, 1, 2, 3 = 1, 2, 3, 4, 6, 7, 8, 9, 11, 15
   = 1111011110100010

Receiver $C$ has 4, 8, 12, +10, 1+12, 14, 16, 1, 6, 7,
   8=4, 6, 7, 10, 14, 16=0001011001000101

They are now separately addressable in longitudinal stripes resolvable on the earth's surface to a distance corresponding to the smallest path length difference resolution in round 1.

A numerical example will now be described of a system designed to cover the United Kingdom using the Hotbird (RTM) satellites. The system provides resolution in two substantially orthogonal directions; as it happens they are substantially aligned with latitude and longitude. Using the differential path length range profile derived from the reported position of the Hotbird satellites 1 and 2 (latitudinal resolution) and the profile derived from the reported position of the Hotbird satellites 3 and 1 (longitudinal resolution), it can be shown that the latitudinal differential path length is about 1500 m and the longitudinal differential path length is about 2000 m.

For a division of the UK land length into 5 rows requires;
Latitudinal resolution: better than 300 m in the resolving plane.
Latitudinal unambiguous differential path range>1500 m (say 3000 m).

So, from the unambiguous differential path range requirement, the frequency step size $\Delta F$ should be given by:

$\Delta F = 3 \cdot 10^8 / 3000 = 1 \cdot 10^5 = 100$ kHz or less.

From the resolution requirement, better than 300 m is required in the resolution plane. This requires dividing the total unambiguous differential path range into at least 10 range stripes, say using 16 frequencies. Then the total bandwidth required for minimum ambiguous distance would be 16×100 kHz=1.6 MHz. This results in a resolution plane distance between adjacent filters of the filter bank of:

$c/(16 \cdot \Delta F) = 188$ m, giving 1500/188=8 rows between the North and South of the UK In similar manner, a division of the UK land area into 4 'stripes' requires for the longitudinal mapping requires;
Longitudinal resolution: better than 500 m in the resolving plane
Longitudinal unambiguous differential range>2000 m (say 5000 m).

The unambiguous differential range requirements give a maximum step size as:

$\Delta F = 3 \cdot 10^8 / 5000 = 6 \cdot 10^4 = 60$ kHz or less and the resolution requires at least 10 steps (say 32), giving a minimum system bandwidth requirement of 1.92 MHz, say 2000 kHz.

The key values for each round at each earth observation point are presented below for one particular example for an 8 bit test sequence. The use of only 8 bits allows the easy assimilation of the characteristics of each round.

For this simple illustrative example, two uniform step frequency waveforms are used making two rounds, both utilising an M-point Discrete Fourier Transform filter bank at the receiver.

In round 1 of this illustrative example the transmitted waveform is made up of 8 frequency transmissions separated by a step size of 1 MHz. This corresponds to an unambiguous variation in differential path length of 300 m, each filter bank output being separated by the equivalent variation in differential path length of 37.5 m.

In round 2 the transmitted waveform is of the same form as round 1 but with the frequency step size chosen to be 1.25 MHz. This corresponds to an unambiguous variation in differential path length of 240 m and a distance between the adjacent filter bank outputs of 30 m.

Note that for the simple example presented, with the cyclic shift occurring in round 1 every 300 m, and that of round 2 occurring every 240 m, both will be in the same relative position every 1200 m, that is, receivers set apart by a variation in differential path length 1200 m will see the same combined output. In a real world example in which a number of rounds can be employed, this figure should be designed to be greater than the variation in differential path length across the entire segmented footprint.

The outputs of the digital filter bank at the end of round 1 are combined with the outputs at the end of round 2 by applying an amplitude threshold to the outputs in each case and denoting an output of each filter within the bank as a one if over the threshold, or zero if not. The two respective 8-bit words can then be combined simply by performing a bit-wise logical OR function on the words. The resulting 8-point word then represents the output of the process.

The results of this process described above are shown in the table below, with both the intermediate and logical 'ORed' 8 bit word evaluated for a number of receiver points separated by a variation in differential path length at 50 m intervals.

Frequency Step=1 MHz, 1.25 Mhz
8 bins, 2 rounds,
Unambiguous range=300 m, 240 m
Resolution 37.5 m, 30 m

| Observation point Δpath length (m) | Round 1 ΔF = 1 Mhz Linear | Round 2 ΔF = 1.25 Mhz Linear | Round 1 OR Round 2 |
|---|---|---|---|
| 0.0 | 10001000 | 10000100 | 10001100 |
| 50.0 | 01000100 | 00100001 | 01100101 |
| 100.0 | 00010001 | 10010000 | 10010001 |
| 150.0 | 10001000 | 00100100 | 10101100 |
| 200.0 | 01000100 | 00001001 | 01001101 |
| 250.0 | 00010001 | 10000100 | 10010101 |
| 300.0 | 10001000 | 00100001 | 10101001 |
| 350.0 | 01000100 | 01001000 | 01001100 |
| 400.0 | 00010001 | 00100100 | 00110101 |
| 450.0 | 10001000 | 00001001 | 10001001 |
| 500.0 | 01000100 | 01000010 | 01000110 |

The table above demonstrates some of the characteristics of the techniques used in each key round. For round 1, each of the two components are individually resolved, separated by four points. This separation is under the control of the transmit waveform design and is constant for each earth observation point. Also in round one, it can be seen that the key received at each point is a cyclic shift as predicted above. Round two however demonstrates that changing the frequency-step size and using the same linear DFT filter bank can change the pattern.

Further Reducing the Relationship Between Keys

For simple implementations with low frequency-step sizes in which all receivers will observe phase change progressions of less than 2π per step, then the key patterns received by each region will be cyclically shifted variations of each other. This means that the receiver in one region might be able to determine the key of another simply by taking its own key and trying each cyclically-shifted variant. This has been overcome in the arrangements described above by utilising a number of sequences of different uniform step sizes to allow different bit patterns to be derived by different sectors within the footprint that are not so simply related. In addition to this technique outlined above, there other ways of using the data to reduce the sensitivity of the system to this relationship between received data in closely spaced regions, examples of which follow.

Combinatorial key generation—This specification has already outlined the role that a resident secret key can play in this system, shown at 142 in FIG. 4. In addition to this it is possible that the algorithm for final key generation in the receiver can indirectly depend upon on the received key, i.e. the received key with its limited regionality becomes a seed for an algorithm that produces more diverse output bit patterns for similar input bit patterns. In this way, the regional key that is detected by the broadcast centre 40 and used as the regional component for the subsequent protection of content over air can be more diverse between geographical regions than that originally received.

Using Non-Uniform Step Sizes—using a set of frequency steps that are non-uniform can further reduce the predictability of the geographical zones formed by the receipt of a common key code. For example, a linearly-increasing step size across the frequency sweep can be employed, as described below. This leads to an increasing phase progression at the receiver across the frequency sweep within a round, in which the size of the received phase steps is proportional to the differential path length d, and the respective frequency step size between subsequent measurement cycles at a particular point in the sequence is:

$$\Delta\phi_i = 2\cdot\pi d\Delta f\cdot K_i/c$$

where:
  d=differential path length at a point on the earth's surface.
  $\Delta\phi_i$=Received phase progression for this frequency transmission i
  c=Speed of light
  $\Delta f\cdot K_i$=Actual step frequency increment at this i th step, ($\Delta f$ modified by $K_i=1, 2, 3 \ldots$)

In order to receive the signal, the receiver is required to phase align the phase-detected outputs. Since the phase adjustment required is dependent upon the position of the receiver differential path length d (i.e., $\Delta\phi_i$ is scaled by d), and all the receivers in the field will apply the same amount according to their pre-loaded filter bank, only those receivers for which the pre-stored phase progression within the resident filter bank is a match to the received phase progression, at their respective differential path lengths d, will be able to 'focus' the key material. Thus, to be effective, the transmission will have to target a certain value of differential path length d, and arrange the total differential delay to result in the corresponding matched receiver filter profile. This 'targeting' approach may be a useful variation on the original abstract algorithm presented earlier. The receiver architecture will still apply, but the nature of the digital filter coefficients will be altered.

If, in the Table above, round three were to show a non-linear step waveform detected using a non-linear receiver filter bank, two different characteristics would be seen. First, the number of resolved components would not always equal two, but would be one or zero depending on how the received phase distribution fits into the pre-arranged non-linear filter characteristics. Secondly, there would be no clear relationship between the key patterns in round three over the observation points calculated. These two characteristics are highly desirable for the accurate location of receivers.

What is claimed is:

1. A method of addressing groups of broadcast satellite receivers within a physical geographic portion of a total footprint within which broadcast signals from a common broadcast source can be received, the method comprising:
   at each of two or more satellite transmitters having a common transmission frequency band, transmitting two or more respective signals at each of a plurality of frequencies within the common transmission frequency band;
   at each of selected ones of the receivers, comparing a relative phase of the signals received from the two or more satellite transmitters at each of the frequencies and generating an indicator representative of a characteristic of the relative phase at each of the frequencies;
   generating from the indicator a common key for the receivers in a certain location to access location-based services for those receivers that are in possession of the common key;
   conveying the common key to a broadcast source;
   encoding services for the receivers that are in possession of the common key with reference to the common key; and
   wherein:
   there are a plurality of transmission rounds and in each of the transmission rounds the signals are transmitted at the plurality of frequencies, the frequencies being different for the different transmission rounds; and
   the received signals are subjected to a Fourier transform, and a resultant of the transform for the different transmission rounds are combined to produce a multibit codeword.

2. In a system for addressing groups of broadcast satellite receivers within a physical geographic portion of a total footprint within which broadcast signals from a common broadcast source can be received, the system comprising two or more satellite transmitters having a common transmission frequency band and a transmitter circuit adapted to transmit two or more respective satellite transmission signals within the common transmission frequency band, the plurality of receivers adapted to compare the received satellite transmission signals and to determine therefrom a plurality of different indicators dependent upon a path length difference between the transmitters and the receivers, a generator adapted to generate from the indicators a common key for the receivers in a certain location to access location-based services for those receivers that are in possession of the common key, a signal path adapted to convey the common key to a broadcast source, and an encoder adapted to encode services for the receivers that are in possession of the common key with reference to the common key;
   a receiver from the plurality of receivers, wherein said receiver comprises:
   a radio-frequency input stage adapted to receive the satellite transmission signals;
   a downconverter coupled an output of the radio-frequency input stage adapted to convert the received satellite transmission signals to baseband; and phase comparison means coupled to an output of the downconverter and adapted to compare phases of the satellite transmission signals received from two different satellites and to determine therefrom the plurality of different indicators dependent upon the path length difference from the transmitters, wherein the phase comparison means comprises storage means configured to store and hold successive phase difference measurements making up a round of transmissions over a plurality of transmission frequencies, the phase comparison means determining therefrom the plurality of different indicators together forming a multibit key appropriate to receiver location, the key being used to decode broadcast signals received by the receiver from the satellite transmitters.

3. A system according to claim 2, in which the phase comparison means comprises a phase-locked loop and means adapted to receive a first satellite transmission and to lock the phase-locked loop to it, and means adapted to compare a phase of a second satellite transmission with a phase of the phase-locked loop.

4. A system according to claim 2, further comprising a Fourier transform device coupled to receive results of the phase comparison and to generate therefrom a multi-bit codeword.

5. A system according to claim 4, further comprising means adapted to combine multi-bit codewords provided by the Fourier transform device for a plurality of transmission rounds in each of which the satellite transmission signals are transmitted at a plurality of frequencies.

6. A system according to claim 5, in which the frequencies are different for different transmission rounds.

* * * * *

UNITED STATES PATENT AND TRADEMARK OFFICE
CERTIFICATE OF CORRECTION

PATENT NO. : 8,130,948 B2
APPLICATION NO. : 11/462099
DATED : March 6, 2012
INVENTOR(S) : Nigel Christopher Earnshaw It is certified that error appears in the above-identified patent and that said Letters Patent is hereby corrected as shown below:

Col. 5: line 54, insert --line-- before "to the paths 14, 16"

Col. 6: line 19, replace "Earth" with --Earth's--; line 56, insert --a-- between "over" and "period"; line 61, replace "earth" with --earth's--

Col. 8: line 9, insert --are-- before "combined"

Col. 9: line 13, replace "pattern" with --patterns--

Col. 11: line 17, replace "though" with --through--; line 21, replace "receiver" with --receiver's--

Col. 13: line 37, replace "word" with --words--

Col. 14: line 2, replace "secre" with --secrets ('keys') associated with releasing the protocol content in a secure manner.--

Col. 16: line 19, replace "though" with --through--; line 29, replace "on" with --in--; line 37, replace "of" with --at--; line 60: replace "Si" with --sl--

Col. 17: line 19, replace "Instances figures" with --instanced figures--

Col. 18: line 32, replace "pattern," with --patterns,--; line 39, replace "position" with --positions--; line 61, replace "though" with --through--

Col. 18: line 44, replace "ambiguous" with --unambiguous--; line 50, replace "UK" with --UK.--; line 52, replace ""stripes' requires for" with --'stripes' for--

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,130,948 B2

Col. 20: line 28, replace "as a one" with --as one--

Col. 21: line 13, replace ", there other" with --, there are other--